(12) United States Patent
Ritz (10) Patent No.: US 9,903,153 B2
(45) Date of Patent: Feb. 27, 2018

(54) ACOUSTIC MULLION PLUG

(71) Applicant: Andrew P. Ritz, Villa Rica, GA (US)

(72) Inventor: Andrew P. Ritz, Villa Rica, GA (US)

( * ) Notice: Subject to any disclaimer, the term of this patent is extended or adjusted under 35 U.S.C. 154(b) by 0 days.

(21) Appl. No.: 15/187,140

(22) Filed: Jun. 20, 2016

(65) Prior Publication Data

US 2016/0369498 A1 Dec. 22, 2016

Related U.S. Application Data (60) Provisional application No. 62/182,340, filed on Jun. 19, 2015.

(51) Int. Cl.
| | | |
|---|---|---|
| *E04B 1/86* | (2006.01) | |
| *E06B 3/68* | (2006.01) | |
| *E04B 2/96* | (2006.01) | |

(52) U.S. Cl.
CPC .................. *E06B 3/68* (2013.01); *E04B 1/86* (2013.01); *E04B 2/96* (2013.01)

(58) Field of Classification Search
CPC . E04B 1/8209; E04B 1/86; E04B 2/96; E06B 3/68
USPC .................................................. 181/290, 284
See application file for complete search history.

(56) References Cited

U.S. PATENT DOCUMENTS

| | | | |
|---|---|---|---|
| 2,112,631 A | 1/1936 | MacDonald | |
| 3,038,571 A | 6/1962 | Clements | |
| 4,011,356 A * | 3/1977 | Lambert | ........... B32B 17/10036 181/286 |
| 4,964,250 A | 10/1990 | Nelson | |
| 4,989,688 A | 2/1991 | Nelson | |
| 5,154,953 A * | 10/1992 | de Moncuit | ...... B32B 17/10045 181/286 |
| 5,202,174 A | 4/1993 | Capaul | |
| 5,424,497 A | 6/1995 | Dias | |
| 5,644,872 A | 7/1997 | Perdue | |
| 6,074,732 A * | 6/2000 | Garnier | ................... B32B 17/10 181/289 |
| 6,698,543 B2 | 3/2004 | Golterman | |
| 8,474,198 B2 * | 7/2013 | Neple | ............... B32B 17/10009 181/286 |
| 8,572,914 B2 | 11/2013 | Burgess | |
| 8,782,977 B2 * | 7/2014 | Burgess | .................... E04B 2/00 52/235 |
| 2014/0230336 A1 * | 8/2014 | Flener | ................... B60J 5/0412 49/472 |

FOREIGN PATENT DOCUMENTS

| | | | | |
|---|---|---|---|---|
| CN | 203703772 | * | 7/2013 | ............... E06B 3/00 |
| CN | 205206601 | * | 5/2016 | ............... E06B 3/26 |

* cited by examiner

*Primary Examiner* — Forrest M Phillips
(74) *Attorney, Agent, or Firm* — Jones IP Law, LLC; Dennis W. Jones (57) ABSTRACT

An acoustic mullion plug having a composite core construction that includes a mineral plug core enclosed on at least one side by a sound transmission barrier, and includes a fabric covering, is installed via applying a sealant to the wall partition and to the glazing adjacent each end of a mullion and to the mullion itself, so that the acoustic mullion plug is then pressed into the opening and secured into position via either adhesive or via hook-and-loop fastener.

16 Claims, 6 Drawing Sheets

ACOUSTIC MULLION PLUG

CROSS-REFERENCE TO RELATED APPLICATIONS

This application claims the benefit of U.S. Provisional Application No. 62/182,340, entitled "Acoustic Mullion Plug," filed Jun. 19, 2015, which is incorporated herein by reference as if set forth herein in its entirety.

BACKGROUND

This invention pertains to sound reduction and absorption. More particularly, this invention pertains to an acoustic plug for reducing sound along window mullions and similar locations that have little or no sound insulation.

Sound generated inside a building can travel through the walls, and/or the floor and ceiling assemblies. This type sound comes from human activities in adjacent spaces or from mechanical noise within the building systems. Human generated sound activities can include voice, amplified sound, or animals, as well as foot traffic on the floor above a ceiling.

Although providing for a beautiful appearance, glass curtain wall facades are not designed to prevent noise transfer between interior spaces that line the outside walls of an office building. Interior walls and partitions have been developed to prevent noise transfer between rooms. Drop-in and other type ceilings provide for extra layers of sound insulation from above an office. However, a weak link in noise reduction occurs when walls and partitions are terminated at exposed window mullions.

FGI Guidelines for Healthcare Construction and International Building Code for Multi-Family Dwellings have minimum Sound Transmission Class (STC) requirements for demising walls. When tested as an assembly, a demising wall that terminates at an exposed mullion will not meet the minimum code requirements.

A standard mullion has an STC rating of 28. When the mullion is left exposed, sound will transfer between rooms and be a problem due to the poor noise deadening performance of the mullion.

Acoustical wall and ceiling panels are typically constructed of many different type materials, coverings, and/or finishes. Ideally the covering will have little impact on the acoustical capability of the sound absorption or blocking material.

Fabric covered panels are one way to maximize the acoustical absorption capabilities of the acoustical material. Mineral fiber board, or Micore, is one commonly used acoustical substrate. Fiberglass is another material that is commonly used as an acoustical substrate. Fabric or other finishing materials, such as wood or metal, are generally chosen to provide acoustical transparency, that is, they are chosen so as not to impede a sound wave.

BRIEF SUMMARY

According to one embodiment of the present invention, an acoustic mullion plug has a composite core construction that includes a mineral plug core enclosed on both sides by a sound transmission barrier. In another embodiment, the composite core construction includes a mineral plug core and a single sound transmission barrier. In yet another embodiment, the composite core construction includes a fiberglass core having capability for a single and/or a double layer sound transmission barrier. The composite core construction provides rigidity to the acoustic mullion plug for ease of fit and installation, as well as aesthetics.

In one embodiment, the acoustic mullion plug also includes a covering, that is, a fabric, and covers the ends, sides, and top of the acoustic plug. The fabric is secured in place to the back of the acoustic mullion plug.

In one embodiment of a typical installation, adhesive or sealant is applied to the wall partition and to the glazing adjacent each end of the mullion and to the mullion itself. That is, sealant is applied to any and all relevant openings through which sound can travel. An acoustic mullion plug is then inserted into the opening and secured into position.

Specifically, the installation process includes (1) determining the correct location for the acoustic plug, (2) removing any existing window blinds and/or brackets to provide clear access, (3) filling all gaps and/or cracks between the wall partition and the mullion with acoustical sealant, (4) and pressing the acoustic mullion plug firmly into position. If the acoustic mullion plug includes a hook-and-loop type fastener, then the backing from the hook-and-loop fastener is removed before pressing the acoustic mullion plug into place. Otherwise, an adhesive is applied to the mullion.

Other systems, methods, features and advantages of the present invention will be or become apparent to one with skill in the art upon examination of the following drawings and detailed description. It is intended that all such additional systems, methods, features and advantages be included within this description and be within the scope of the present disclosure.

BRIEF DESCRIPTION OF THE DRAWINGS

The above-mentioned features will become more clearly understood from the following detailed description read together with the drawings in which:

FIG. 1-A is a perspective view of an acoustic mullion plug for improved sound insulation;

FIG. 1-B is a perspective view of an acoustic mullion plug including a partial illustration of a cover;

FIG. 2-A is a top view of the acoustic mullion plug of FIG. 1-A;

FIG. 2-B is a side view of the acoustic mullion plug of FIG. 1-A;

FIG. 2-C is an end view of the acoustic mullion plug of FIG. 1-A;

DETAILED DESCRIPTION

An acoustic mullion plug for reducing sound along window mullions and similar locations that lack sound insulation, is disclosed. The acoustic mullion plug provides further sound insulation in locations that originally included little or no sound insulation.

Sound generated inside a building can travel through the walls, and/or the floor and ceiling assemblies. This type sound comes from human activities in adjacent spaces or from mechanical noise within the building systems. Human generated sound activities can include voice, amplified sound, or animals, as well as foot traffic on the floor above a ceiling.

Although providing for a beautiful appearance, glass curtain wall facades are not designed to prevent noise transfer between interior spaces that line the outside walls of an office building. Interior walls and partitions have been developed to prevent noise transfer between rooms. Drop-in and other type ceilings provide for extra layers of sound insulation from above an office. However, a weak link in noise reduction occurs when walls and partitions are terminated at exposed window mullions.

FGI Guidelines for Healthcare Construction and International Building Code for Multi-Family Dwellings have minimum Sound Transmission Class (STC) requirements for demising walls. When tested as an assembly, a demising wall that terminates at an exposed mullion will not meet the minimum code requirements.

A standard mullion has an STC rating of 28. When the mullion is left exposed, sound will transfer between rooms and be a problem due to the poor noise deadening performance of the mullion. The disclosed acoustic mullion plug 100 can increase the STC rating at the mullion significantly, up to as much as 57.

Acoustical wall and ceiling panels are typically constructed of many different type materials, coverings, and/or finishes. Ideally the covering will have little impact on the acoustical capability of the sound absorption or blocking material.

Fabric covered panels are one way to maximize the acoustical absorption capabilities of the acoustical material. Mineral fiber board, or Micore, is one commonly used acoustical substrate. Fiberglass is another material that is commonly used as an acoustical substrate. Fabric or other finishing materials, such as wood or metal, are generally chosen to provide acoustical transparency, that is, they are chosen so as not to impede a sound wave.

Many locations that can benefit from an acoustic mullion plug include demising walls between tenant spaces, conference rooms, private offices, break rooms, huddle rooms, and audio visual rooms.

Figure 1:
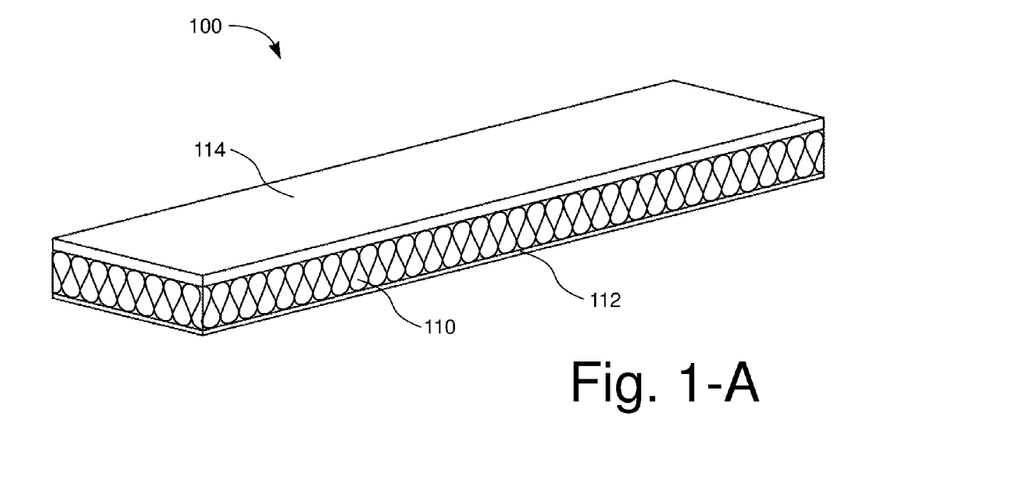
Figure 2:
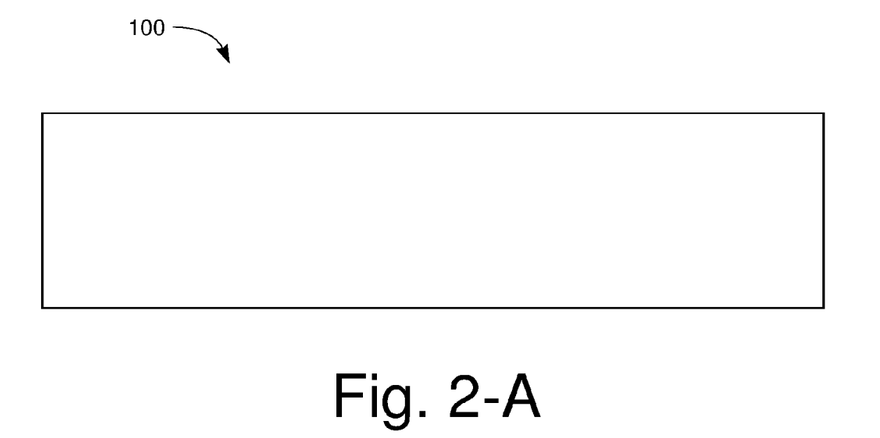

FIG. 1-A is a perspective view of an acoustic mullion plug 100 for improved sound insulation. FIG. 1-B is a perspective view of the acoustic mullion plug 100 that includes a partial cover. FIG. 2-A is a top view of the acoustic mullion plug 100, FIG. 2-B is a side view of the acoustic mullion plug 100 and FIG. 2-C is an end view of the acoustic mullion plug 100. In the illustrated embodiment, the acoustic mullion plug 100 has a composite core construction that includes a mineral plug core 110 enclosed on both sides by a sound transmission barrier 112, 114. In some embodiments, there is a single sound transmission barrier 112 rather than two. In one embodiment, the composite core construction includes a mineral plug core 110. This composite core construction provides rigidity to the acoustic mullion plug 100 for ease of fit and installation, as well as aesthetics.

A fastening means 116 provides for securing or attaching the acoustic mullion plug 100 to a mullion. In some embodiments, an additional fastening means also provides for attachment to the end of a wall or partition, and/or a window at any of the non-exposed portions of the acoustic mullion plug 100. In the illustrated embodiment, the fastening means 116 is one portion of a hook and loop type fastener affixed to the rear of the acoustic mullion plug 100. The one portion of the hook and loop type fastener is then secured to a corresponding hook and loop fastener portion or to any other surface capable of receiving a hook and look type fastener.

In another embodiment, the fastening means 116 is an adhesive is affixed to any or all non-exposed portions of the acoustic mullion plug 100 for securing to a mullion and to other portions of a window, a wall, or a wall type structure. In still another embodiment, the fastening means 116 is a sealant applied to the non-exposed portions of the acoustic mullion plug 100 and/or the window, wall, and/or wall type structure, whereby the acoustic mullion plug 100 is pressed into position.

The mineral plug core 110 is formed from any suitable sound absorbing material, such as fiberglass, polystyrene, or any other type porous material that is suitable for absorption of ambient sound. In one embodiment, the single sound transmission barrier 112 provides for blocking the sound from exiting the mineral plug core 110 to further deaden the sound transmission coming into or exiting from the office or other protected area. For acoustic plugs with two sound transmission barriers 112, 114, added blocking occurs from either direction.

In other embodiments, the composite core construction includes a fiberglass core having capability for a single layer sound transmission barrier, or for a double layer sound transmission barrier.

In one embodiment, the sound transmission barrier is a flexible, dense polymer barrier that absorbs or dampens vibrations in the structure. This dampening reduces the sound transmission of airborne noise. In one typical embodiment, the sound transmission barrier dampens sound from one direction.

A typical acoustic mullion plug 100 has a thickness in the ¾ inch to 1 inch range. In other embodiments, a custom thickness is provided. Acoustic mullion plugs 100 can be made to any desired thickness according to the desired level of sound reduction to be achieved. The width and height dimensions are custom fabricated to the measurements of the particular opening as determined by an installer in the field.

As is evident in FIG. 1-B, the acoustic mullion plug 100 also includes a covering 140. In a typical embodiment, the covering 140 is a fabric and covers the ends, sides, and top of the acoustic mullion plug 100, while being held in place by being secured to the back of the acoustic mullion plug 100. The fabric is color coordinated as desired and in accordance with the installation location. Those of skill in the art will appreciate, that the covering may be fabric, or any other type covering as is commonly utilized in walls and partitions of commercial locations.

In one embodiment, the acoustic mullion plugs 100 are installed by applying an adhesive in the location for installation, and then pressing the pre-measured and fitted acoustic mullion plug 100 into the desired location. In another embodiment, the acoustic mullion plugs 100 are installed via a hook-and-loop (i.e., Velcro™) type fastening attachment. In another embodiment, the acoustic mullion plugs 100 are installed by a combination application of adhesive used with a hook-and-loop type fastener. In various other embodiments, the acoustic mullion plugs 100 are installed via an adhesive strip, or an adhesive sealant. Of course, those of skill in the art will readily appreciate other suitable methods for securing the acoustic mullion plugs 100 in a desired location.

Figure 3:
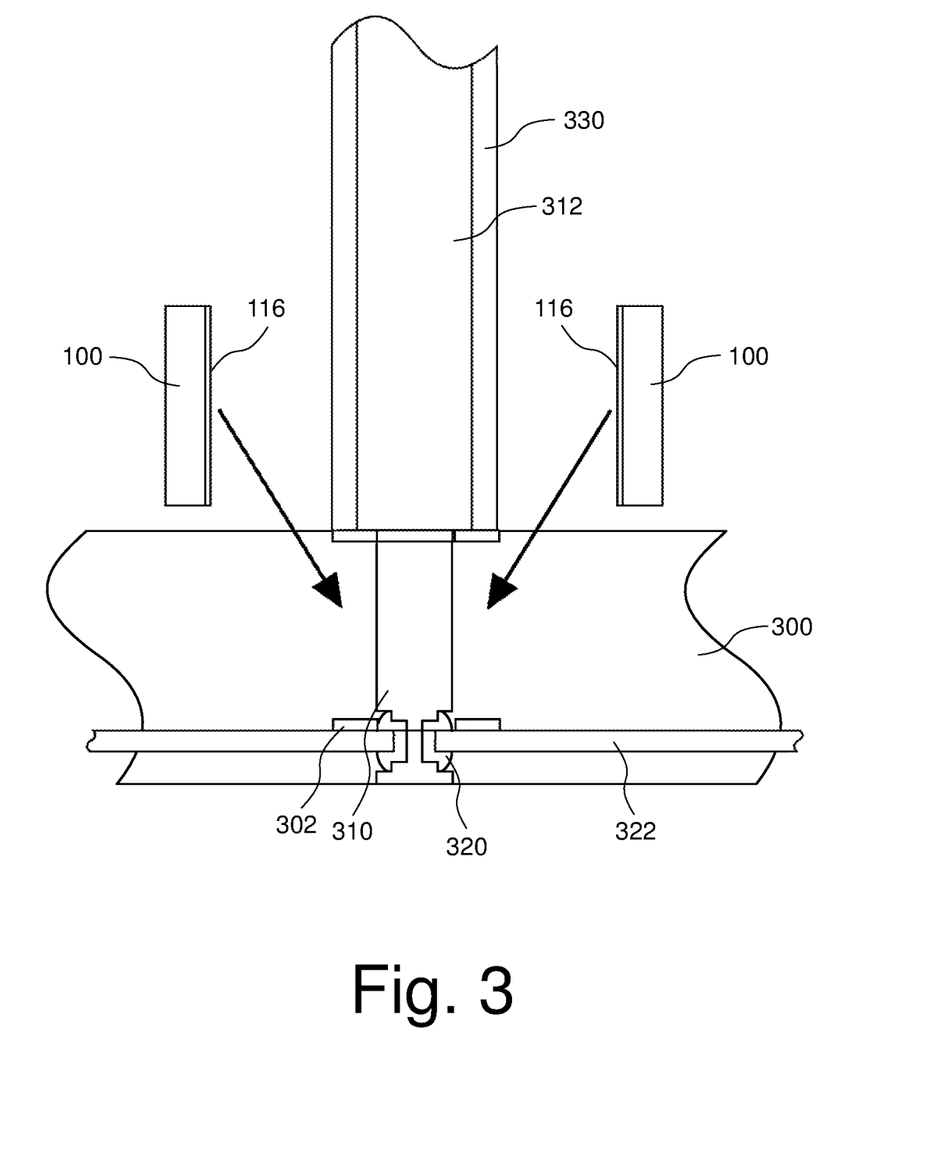
FIG. 3 is a top view, exploded diagram illustrating the installation of acoustic mullion plugs in an office environment.
Figure 4:
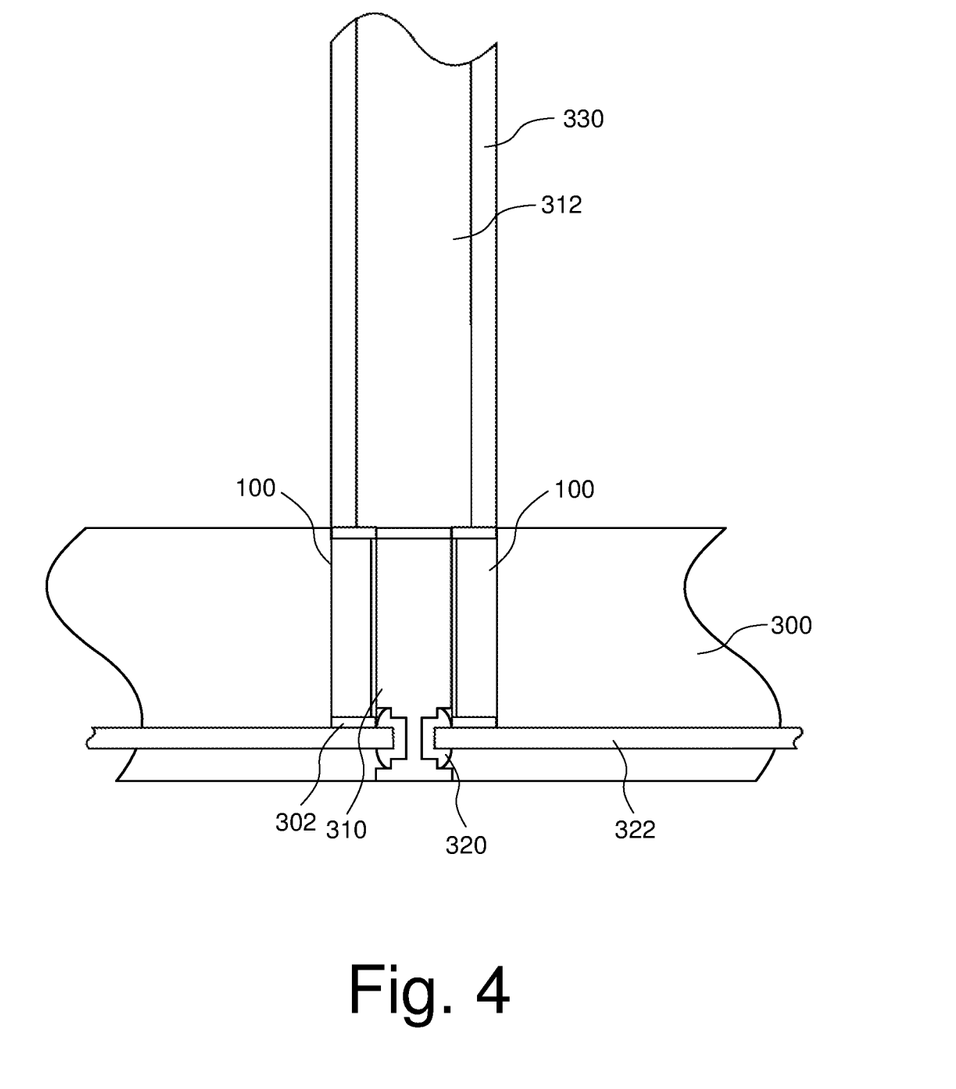
FIG. 4 is a top view illustrating installed acoustic mullion plugs in an office environment.

FIG. 3 is a top view, exploded diagram illustrating the installation of acoustic mullion plugs 100 in an office environment, and FIG. 4 is a top view illustrating installed acoustic mullion plugs 100 in the office environment. In an office environment, acoustic mullion plugs 100 are typically installed against either side of a first mullion 310 at the end of a wall partition 312. The acoustic mullion plugs 100 are custom fit to the open space against the first mullion 310, the space being situated between the wall partition 312 and the glazing (or window) 322, and extending upward from the window sill 300. The glazing 322 is secured to a second mullion 320 at the end of the first mullion 310 and opposite the end of the wall partition 312. In some instances, the open space against the mullion 310 may extend all the way to the floor rather than to a window sill 300. In such an instance the illustrated view of FIG. 4 appears unchanged relative to the mullion 310.

In a typical installation, adhesive or sealant 302 is applied to the wall partition 312 and to the glazing 322 adjacent each end of the mullion 310 and to the mullion itself. That is, adhesive or sealant is applied to any and all relevant openings through which sound can travel. An acoustic mullion plug 100 is then inserted into the opening and secured into position.

Specifically, one installation process includes (1) determining the correct location for the acoustic mullion plug 100, (2) removing any existing window blinds and/or brackets to provide clear access, (3) filling all gaps and/or cracks between the wall partition 312 and the mullion 310 with acoustical sealant or some other method for blocking the sound traveling space around the acoustic mullion plug, (4) and pressing the acoustic mullion plug 100 firmly into position. If the acoustic mullion plug includes a hook-and-loop type fastener, then the backing from the hook-and-loop fastener is removed before pressing the acoustic mullion plug 100 into place. Otherwise, an adhesive of some type can be applied to the mullion 310.

As is evident in FIG. 4, once the acoustic mullion plugs 100 are installed into the mullion openings, sound travel around the end of the wall partition 312 is reduced. It should also be noted that the aesthetic improvement in many locations will be evident, as the wall partition 312 will effectively extend all the way to the window.

Figure 5:
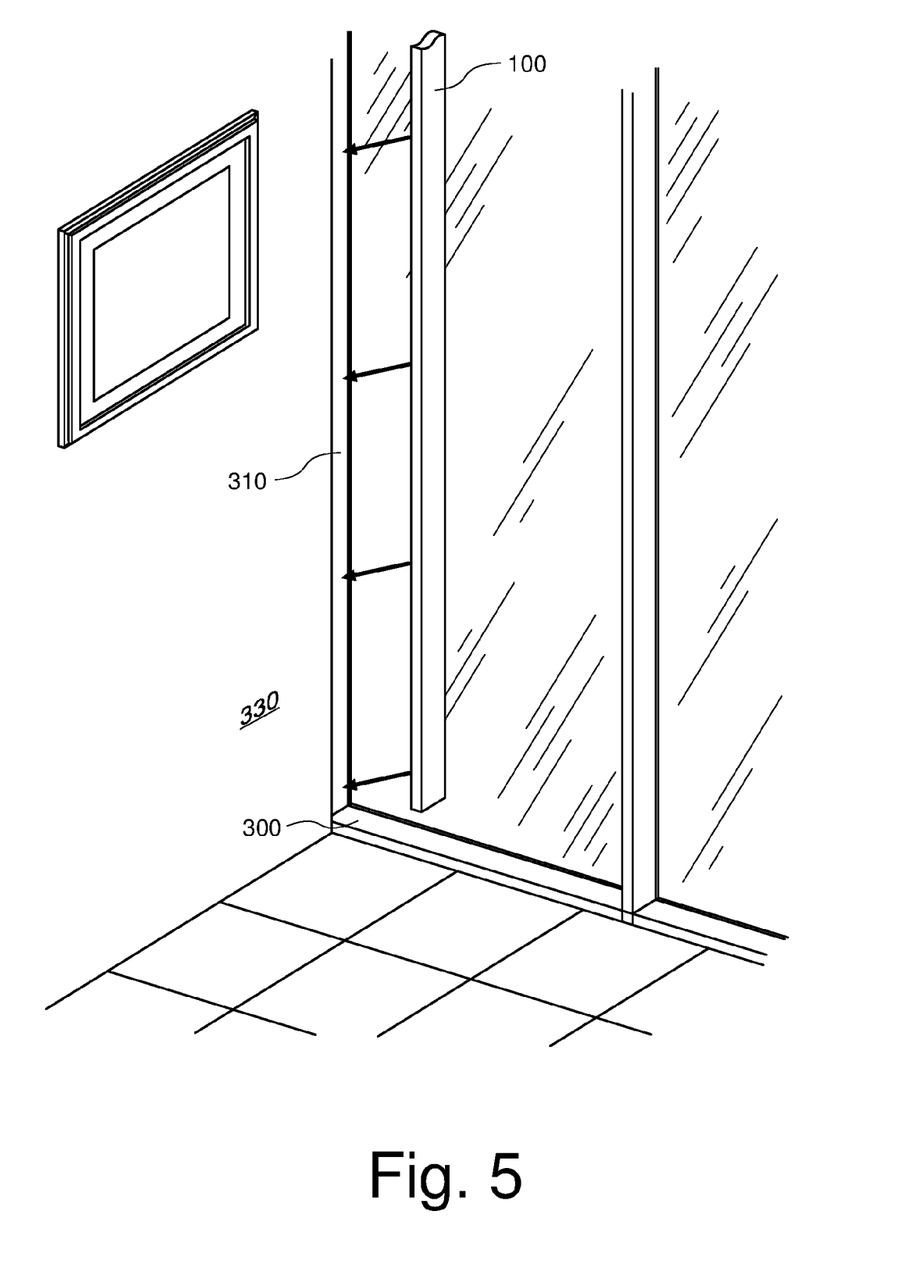
FIG. 5 is a perspective view illustrating the installation of an acoustic mullion plug in an office environment.
Figure 6:
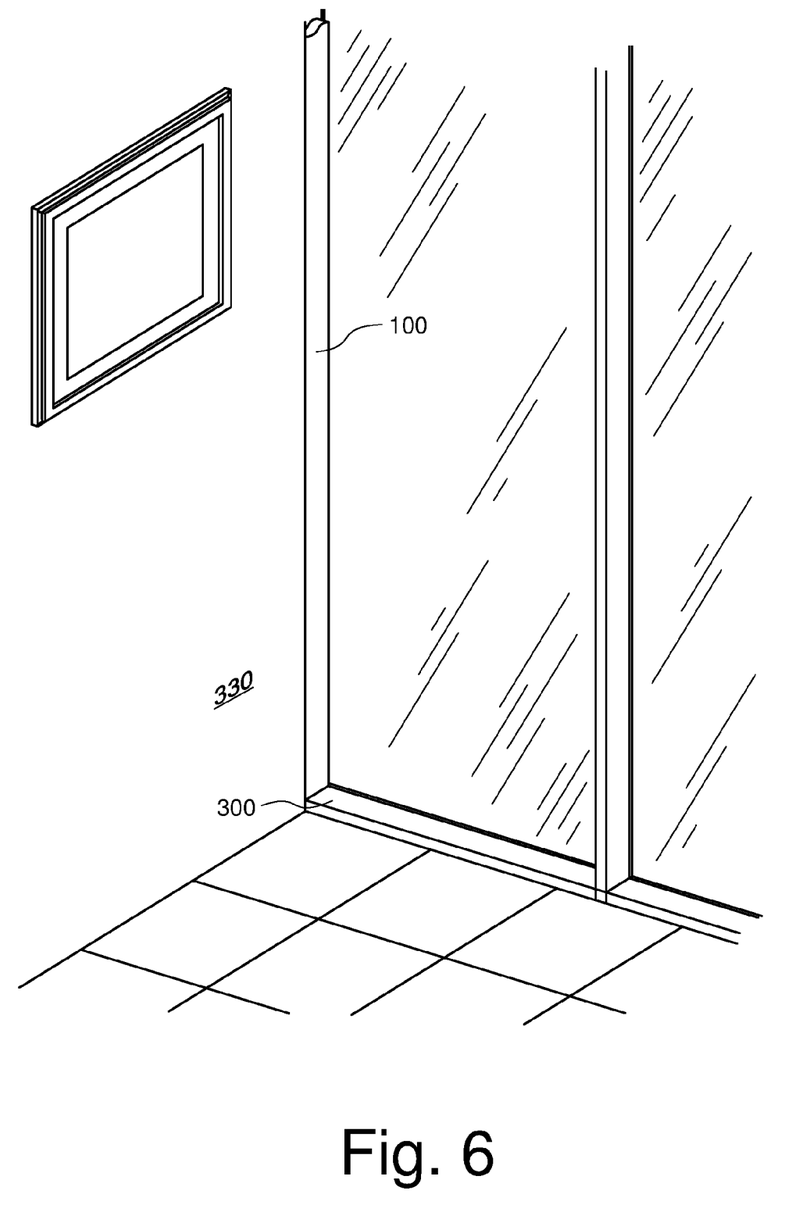
FIG. 6 is a perspective view illustrating an acoustic mullion plug installed in an office environment.

FIG. 5 is a perspective view illustrating the installation of an acoustic plug 100 in the office environment, and FIG. 6 is a perspective view illustrating an acoustic mullion plug 100 installed in the office environment. The perspective view in FIG. 5 illustrates the installation of the acoustic mullion plug 100 into the mullion opening between the end of a wall partition 312 and the glass of the window. The custom sized acoustic mullion plug 100 is inserted into the open space and against the mullion 310. As is evident, the open space extends from the window sill 300 or floor along the entire length of the wall partition 312. In a typical environment, the open space would extend to the ceiling.

The perspective view in FIG. 6 illustrates an acoustic mullion plug 100 secured in place between the end of the wall partition 312 (behind wall covering 330) and the window. The aesthetics are instantly more pleasing since the wall now has the appearance of extending all the way to the window. Of course, the covering 140 is coordinated with the wall covering 330 to enhance this appearance. Installing an acoustic mullion plug 100 into the openings on both sides of the mullion 310 provide for increased sound reduction in both office spaces.

The acoustic mullion plug 100 includes various functions.

The function of a fastening means 116 is implemented, in one embodiment, by a hook and loop fastener. The function of a fastening means 116 is implemented, in another embodiment, by an adhesive strip. The function of a fastening means 116 is implemented, in another embodiment, by an adhesive sealant.

The function of a sound transmission barrier 112, 114 is implemented, in one embodiment, via a dense polymer that absorbs or dampens vibrations, such as sound vibrations.

An acoustic mullion plug 100 for sound insulation along mullions 310 near exterior walls, and includes (1) a composite core having dimensions of length, width, and thickness forming a rectangular structure, the composite core corresponding to an opening at a mullion 310 at a wall partition end, the composite core including a mineral plug core 110 formed from a sound absorbing material, (2) a first transmission barrier 112 adjacent one side of the composite core for blocking sound from exiting the composite core, (3) a cover secured to visible portions of the structure, and a fastening means 116 applied to non-visible portions of the structure for securing the rectangular structure in position.

In one embodiment of the acoustic mullion plug 100, the sound absorbing material is a porous material suitable for absorption of sound. In another embodiment of the acoustic mullion plug 100, the sound absorbing material is at least one of fiberglass, and polystyrene.

In one embodiment of the acoustic mullion plug 100, the composite core provides rigidity to the acoustic mullion plug 100.

In one embodiment, the acoustic mullion plug 100 includes a second transmission barrier 114 adjacent the composite core and opposite the first transmission barrier 112.

In one embodiment, the composite core of the acoustic mullion plug 100 is a fiberglass core.

In various embodiments, the fastening means of the acoustic mullion plug 100 includes at least one of (1) a hook and loop fastener, (2) an adhesive strip, and (3) and adhesive sealant.

One embodiment for reducing ambient sound via an acoustic plug along mullions 310 near exterior walls, includes (1) providing a composite core having dimensions of length, width, and thickness forming a rectangular structure, the composite core including a mineral plug core 110 formed from a sound absorbing material, the length, width, and thickness of the composite core corresponding to an opening at a mullion 310 between a wall partition end and an exterior wall, (2) orienting the composite core so that a cover is visible and non-visible portions of the composite core are situated adjacent the wall partition 312, the mullion 310, and the exterior wall, (3) positioning the composite core so that a first transmission barrier 112 adjacent one side of the composite core is situated against the mullion 310 between the wall partition 312 and the exterior wall, and (4) attaching the composite core to the mullion 310 via a fastening means 116 adjacent the first transmission barrier 112, so that the first transmission barrier 112 provides for blocking sound from exiting the composite core.

From the foregoing description, it will be recognized by those skilled in the art that an acoustic mullion plug 100 for reducing sound along window mullions and similar locations having little or no previous sound insulation has been provided. In use, an acoustical sealant or adhesive 302 is applied to the wall partition 312 and to the glazing 322 adjacent each end of the mullion 310 and to the mullion itself. That is, adhesive or sealant is applied to any and all relevant openings through which sound can travel. An acoustic mullion plug 100 is then inserted into the opening and secured into position. Once the acoustic mullion plugs 100 are installed into the mullion openings, sound travel around the end of the wall partition 312 and wall covering 330 is reduced.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. An acoustic plug for sound insulation along mullions near exterior walls, the acoustic plug comprising:
 a composite core having dimensions of length, width, and thickness forming a rectangular structure, the composite core corresponding to an opening at a mullion at a wall partition end, the composite core including a mineral plug core formed from a sound absorbing material;
 a first transmission barrier adjacent one side of the composite core for blocking sound from exiting the composite core;
 a cover secured to visible portions of the structure; and
 a fastening means applied to non-visible portions of the structure for securing the rectangular structure in position.

2. The acoustic plug of claim 1, the sound absorbing material further comprising a porous material suitable for absorption of sound.

3. The acoustic plug of claim 2, the sound absorbing material further comprising at least one of fiberglass and polystyrene.

4. The acoustic plug of claim 1, wherein the composite core provides rigidity to the acoustic plug.

5. The acoustic plug of claim 1, further comprising a second transmission barrier adjacent the composite core and opposite the first transmission barrier.

6. The acoustic plug of claim 1, the composite core being a fiberglass core.

7. The acoustic plug of claim 1, the fastening means further comprising at least one of the following:
 a hook and loop fastener;
 an adhesive strip; and
 an adhesive sealant.

8. A method for reducing ambient sound via an acoustic plug along mullions near exterior walls, the method comprising:
 providing a composite core having dimensions of length, width, and thickness forming a rectangular structure, the composite core including a mineral plug core formed from a sound absorbing material, the length, width, and thickness of the composite core corresponding to an opening at a mullion between a wall partition end and an exterior wall;
 orienting the composite core so that a cover is visible and non-visible portions of the composite core are situated adjacent the wall partition, the mullion, and the exterior wall;
 positioning the composite core so that a first transmission barrier adjacent one side of the composite core is situated against the mullion between the wall partition and the exterior wall;
 attaching the composite core to the mullion via a fastening means adjacent the first transmission barrier, so that the first transmission barrier provides for blocking sound from exiting the composite core.

9. The method of claim 8, wherein the sound absorbing material is a porous material suitable for absorption of sound.

10. The method of claim 9, wherein the sound absorbing material is at least one of fiberglass and polystyrene.

11. The method of claim 8, the composite core further providing rigidity to the acoustic plug.

12. The method of claim 8, wherein the composite core includes a second transmission barrier adjacent the composite core and opposite the first transmission barrier.

13. The method of claim 8, wherein the composite core is a fiberglass core.

14. The method of claim 8, further comprising attaching the composite core to the mullion via a hook and loop fastener.

15. The method of claim 8, further comprising attaching the composite core to the mullion via an adhesive strip.

16. The method of claim 8, further comprising attaching the composite core to the mullion via an adhesive sealant.

* * * * *